United States Patent
Huang

(10) Patent No.: US 11,539,983 B2
(45) Date of Patent: Dec. 27, 2022

(54) VIRTUAL REALITY VIDEO TRANSMISSION METHOD, CLIENT DEVICE AND SERVER

(71) Applicant: ZTE Corporation, Shenzhen (CN)

(72) Inventor: Cheng Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 177 days.

(21) Appl. No.: 16/958,830

(22) PCT Filed: Dec. 29, 2018

(86) PCT No.: PCT/CN2018/125303
§ 371 (c)(1),
(2) Date: Jun. 29, 2020

(87) PCT Pub. No.: WO2019/129258
PCT Pub. Date: Jul. 4, 2019

(65) Prior Publication Data
US 2021/0076081 A1    Mar. 11, 2021

(30) Foreign Application Priority Data

Dec. 29, 2017 (CN) .......................... 201711484881.9

(51) Int. Cl.
*H04N 21/218* (2011.01)
*G06T 19/00* (2011.01)
*H04N 21/6587* (2011.01)

(52) U.S. Cl.
CPC ..... *H04N 21/21805* (2013.01); *G06T 19/003* (2013.01); *H04N 21/6587* (2013.01)

(58) Field of Classification Search
None
See application file for complete search history.

(56) References Cited

U.S. PATENT DOCUMENTS

| 10,270,825 | B2 | 4/2019 | Khalid | |
|---|---|---|---|---|
| 2017/0289219 | A1 | 10/2017 | Khalid | |
| 2018/0061002 | A1* | 3/2018 | Lee | H04N 13/194 |
| 2018/0103199 | A1* | 4/2018 | Hendry | H04N 21/21805 |
| 2018/0176468 | A1* | 6/2018 | Wang | H04N 19/597 |

FOREIGN PATENT DOCUMENTS

| CN | 105812961 A | 7/2016 |
|---|---|---|
| CN | 105915937 A | 8/2016 |
| CN | 106534716 A | 3/2017 |
| CN | 106612426 A | 5/2017 |
| CN | 108111899 A | 6/2018 |

(Continued)

OTHER PUBLICATIONS

"Ozcinar et al., Viewport-Aware Adaptive 360 Video Streaming Using Tiles for Virtual Reality" (Year: 2017).*

(Continued)

*Primary Examiner* — Hilina K Demeter
(74) *Attorney, Agent, or Firm* — Cantor Colburn LLP

(57) ABSTRACT

Disclosed are a video transmission method, a client, and a server. The method includes: a recommended viewport for playing a virtual reality (VR) video is determined; and at least one video file corresponding to the recommended viewport is requested from a server.

17 Claims, 11 Drawing Sheets

(56) References Cited

FOREIGN PATENT DOCUMENTS

WO    2016208988 A1    12/2016
WO    2017205794 A1    11/2017

OTHER PUBLICATIONS

European Search Report for corresponding application EP18 89 3835; dated May 21, 2021.
SC29 [Editors]:, "ISO/IEC JTC 1/SC 29 Information Technology-Coded Representation of Immersive Media (MPEGI) Part 2: Omni-directional Media Format", Dec. 11, 2017, pp. 1-181, XP009524964.
YK Wang (Qualcomm): "An Overview of OMAF (for information)", MPEG Meeting, Dec. 20, 2017, XP030070335.
Chinese Office Action for corresponding application 2017114848881.9; Report dated Jun. 17, 2019.
Chinese Office Action for corresponding application 2017114848881.9; Report dated May 7, 2020.
Chinese Office Action for corresponding application 2017114848881.9; Report dated Nov. 29, 2019.
International Search Report for corresponding application PCT/CN2018/125303 filed Dec. 29, 2018; dated Mar. 18, 2019.
Iraj Sodagar, "MPEG-DASH: The Standard for Multimedia Streaming Over Internet", Communication Group, Apr. 2012.

\* cited by examiner

```
MPD
 <Period id= "1" >
    <EventStream schemeIdUri="urn:avs:vr:event:2018" timescale="1000" value="1">
       <Event presentationTime="0"     duration="10000" id="0" messageData="0,0,0,90,60"/>
       <Event presentationTime="10000" duration="10000" id="1" messageData="60,30,0,90,60"/>
       ...
       <Event presentationTime="90000" duration="10000" id="3" messageData="360,90,0,90,60"/>
    </EventStream>
    <!-- Tiled Video for FOV#1 -->
    <AdaptationSet
      <SSR schemeIdUri="urn:avs:vr:cc:2018" value="0,0,0,90,60"/>
      <Representation id="v11" width="320" height="240" bandwidth="250000"/>
      <Representation id="v12" width="640" height="480" bandwidth="500000"/>
       ...
    </AdaptationSet>
    <!-- Tiled Video for FOV#2 -->
    <AdaptationSet
      <SSR schemeIdUri="urn:avs:vr:cc:2018" value="60,30,0,90,60"/>
      <Representation id="v21" width="320" height="240" bandwidth="250000"/>
      <Representation id="v22" width="640" height="480" bandwidth="500000"/>
       ...
    </AdaptationSet>
      ...
    <!-- Tiled Video for FOV#9 -->
    <AdaptationSet
      <SSR schemeIdUri="urn:avs:vr:cc:2018" value="360,90,0,90,60"/>
      <Representation id="v91" width="320" height="240" bandwidth="250000"/>
      <Representation id="v92" width="640" height="480" bandwidth="500000"/>
       ...
    </AdaptationSet>
   ...
 </Period>
```

FIG. 9

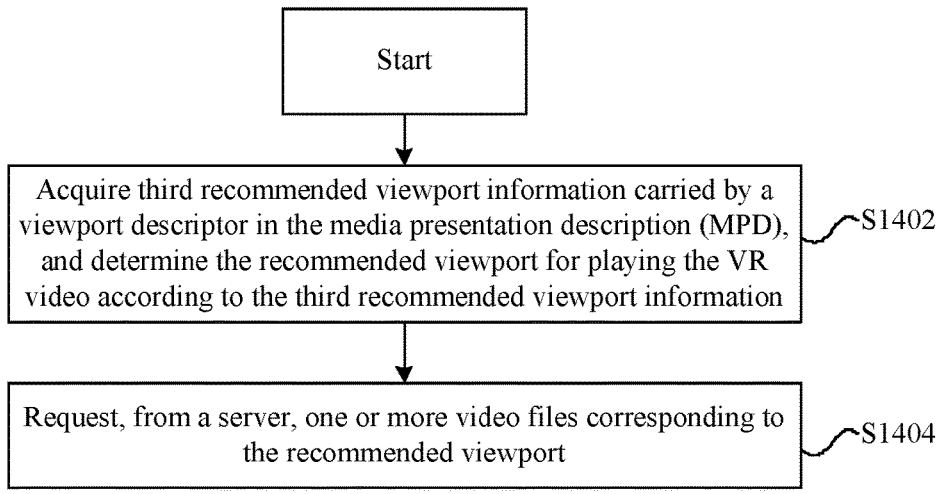

FIG. 14

```
MPD
 <Period id= "1" >
   ...
   <!-- Tiled Video for FOV#1 -->
   <AdaptationSet
     <Viewport schemeIdUri="urn:avs:vr:rcvp:2018" value="0"/>
     <SSR schemeIdUri="urn:avs:vr:cc:2018" value="0,0,0,90,60"/>
     <Representation id="v11" width="320" height="240" bandwidth="250000"/>
     <Representation id="v12" width="640" height="480" bandwidth="500000"/>
     ...
   </AdaptationSet>
   <!-- Tiled Video for FOV#2 -->
   <AdaptationSet
     <Viewport schemeIdUri="urn:avs:vr:rcvp:2018" value="10000"/>
     <SSR schemeIdUri="urn:avs:vr:cc:2018" value="60,30,0,90,60"/>
     <Representation id="v21" width="320" height="240" bandwidth="250000"/>
     <Representation id="v22" width="640" height="480" bandwidth="500000"/>
     ...
   </AdaptationSet>
   ...
   <!-- Tiled Video for FOV#10 -->
   <AdaptationSet
     <Viewport schemeIdUri="urn:avs:vr:rcvp:2018" value="90000"/>
     <SSR schemeIdUri="urn:avs:vr:cc:2018" value="360,-90,0,90,60"/>
     <Representation id="v91" width="320" height="240" bandwidth="250000"/>
     <Representation id="v92" width="640" height="480" bandwidth="500000"/>
     ...
   </AdaptationSet>
   ...
 </Period>
```

FIG. 15

VIRTUAL REALITY VIDEO TRANSMISSION METHOD, CLIENT DEVICE AND SERVER

CROSS-REFERENCE TO RELATED APPLICATIONS

This is a National Stage Application, filed under 35 U.S.C. 371, of International Patent Application No. PCT/CN2018/125303, filed on Dec. 29, 2018, which claims priority to a Chinese patent application No. 201711484881.9 filed on Dec. 29, 2017, the contents of both of which said applications are incorporated herein by reference in their entireties.

TECHNICAL FIELD

This application relates to the field of communications and, for example, to a video transmission method, a client, and a server.

BACKGROUND

In the related art, virtual reality (VR) refers to a three-dimensional virtual world simulated and generated by using computer technologies, so that a user experiences a highly realistic virtual space environment in terms of viewing, listening, touching, tasting and the like. With rapid developments of VR technologies, applications such as a VR video live broadcast and a VR video on-demand are becoming more and more extensive, so that video service experiences with a strong immersion are brought to users.

A VR video transmission scheme includes: a VR panoramic video transmission scheme with an independent user viewpoint and a VR video transmission scheme with an adaptive user viewpoint. In a viewpoint independent transmission mode, a terminal requests from a server to acquire an undifferentiated panoramic video file, and when the user viewpoint changes, all processing is completed at the terminal. Compared with a traditional video, a VR video is characterized in that only a part of panoramic videos corresponding to a user viewpoint (i.e., a user current watching region) is displayed at a certain time, therefore a transmission of other parts of the video causes a waste of network resources.

A VR video transmission scheme that supports a user viewpoint adaptation is also proposed in the related art. In a viewpoint adaptive transmission mode, a transmitted VR video has a predetermined main field of view, and video quality (resolution) in the main field of view is higher than surrounding video quality (resolution). The terminal requests a corresponding VR video file from the server according to a current user viewpoint. When a changing amount of the user viewpoint exceeds a certain threshold, the terminal will request from the server to acquire a VR video file corresponding to a new viewpoint.

However, due to existences of a terminal-server request and response interaction process, as well as of processing steps of video decoding, caching and the like, a more obvious system latency exists between time when changing of the user viewpoint is detected and time when the terminal plays and displays a new VR video picture of a current user viewport in the viewpoint adaptive VR video transmission scheme, which greatly affects user service experiences.

SUMMARY

The present application provides a video transmission method, a client, and a server.

According to the present application, a video transmission method is provided. The video transmission method includes steps described below. A recommended viewport for playing a virtual reality (VR) video is determined; and one or more video files corresponding to the recommended viewport are requested from a server.

According to the present application, another video transmission method in a virtual reality scene is provided. The video transmission method includes steps described below. A virtual reality (VR) video acquisition request sent by a client is received, where the VR video acquisition request carries recommended viewport information; and one or more video files corresponding to the recommended viewport information are returned.

According to the present application, a client is provided. The client includes a determination module and a request module. The determination module is configured to determine a recommended viewport for playing a virtual reality (VR) video. And the request module is configured to request one or more video files corresponding to the recommended viewport from a server.

According to the present application, a server is provided. The server includes a receiving module and a sending module. The receiving module is configured to receive a virtual reality (VR) video acquisition request sent by a client, where the VR video acquisition request carries recommended viewport information. And the sending module is configured to return one or more video files corresponding to the recommended viewport information.

According to the present application, a storage medium is further provided. The storage medium includes a stored program, and the program is executed to perform any one of the above methods.

According to the present application, a processor is further provided. The processor is configured to execute a program, when the program is executed by the processor, it performs any one of the above methods.

BRIEF DESCRIPTION OF DRAWINGS

FIG. 9 is an example of an event message in the MPD according to an alternative implementation of the present application;

FIG. 14 is a flowchart three of a video transmission method according to an implementation of the present application;

FIG. 15 is an example of a viewport descriptor in the MPD according to an alternative implementation of the present application;

DETAILED DESCRIPTION

Hereinafter, the present application will be described in detail with reference to the drawings and in conjunction with embodiments. It should be noted that, in a case of no conflict, the embodiments in the present application and features in the embodiments may be combined with each other.

It should be noted that the terms "first", "second" and the like in the description, claims and the above-described drawings of the present application are used to distinguish between similar objects, and are not necessarily used to describe a particular order or sequence.

Embodiment One

Figure 1:
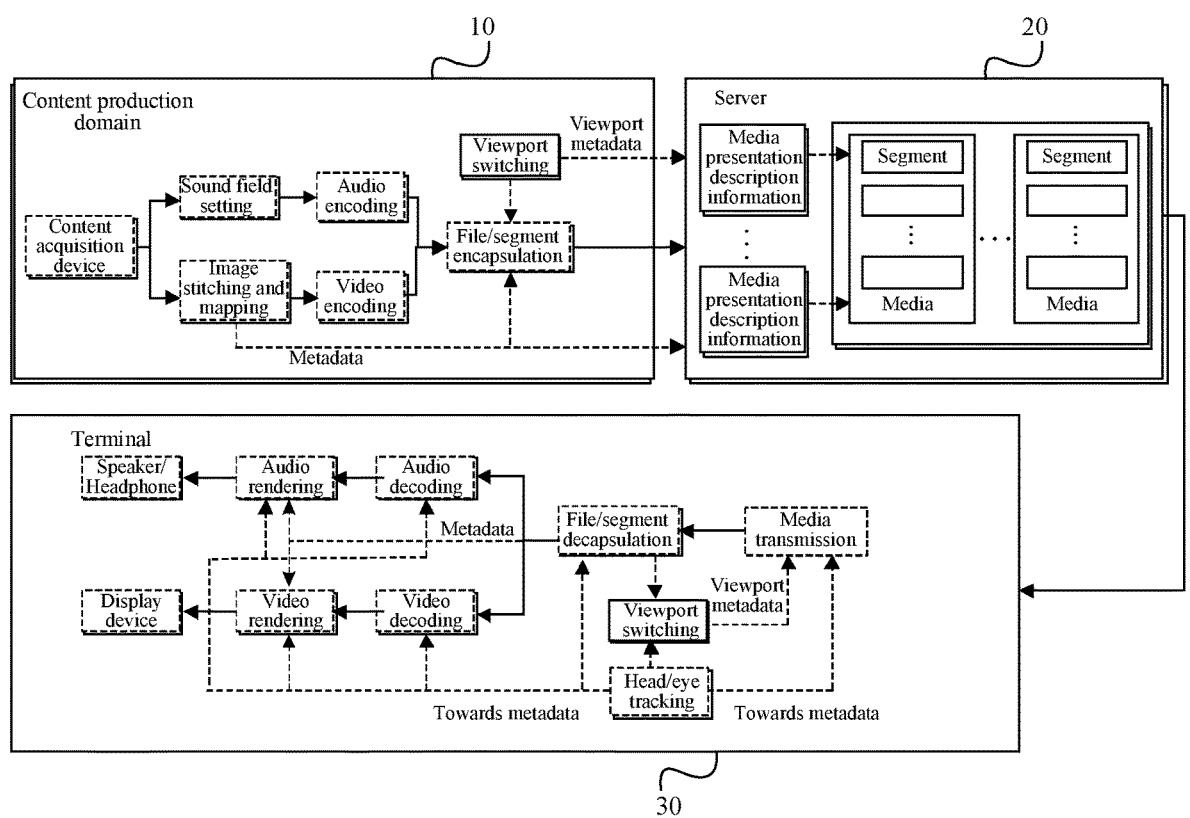
FIG. 1 is a schematic diagram of a structural composition of a video transmission system according to an embodiment of the present application.

FIG. 1 is a schematic diagram of a structural composition of a video transmission system according to an embodiment of the present application. As shown in FIG. 1, the system includes a content production domain 10, a server 20 and a terminal 30.

The content production domain 10 is used for completing a capture, an encoding compression, and a segmentation processing, etc. of audio and video sources, and may be functionally divided into a content acquisition device, an encoder, and an encapsulator.

In a production phase of a virtual reality content, the content acquisition device completes recording of real physical world sound-visual scenes through a group of video cameras or a camera device with multiple cameras and sensors as well as an audio sensor. The cameras may usually acquire video contents in all directions around a center of the device, so these videos are called panoramic videos or 360-degree videos. For a VR video, VR video images at a same moment are stitched and projected onto a three-dimensional projection structure, such as a unit sphere or a regular hexahedron. A VR audio may be acquired through different microphone configurations and may be stored in different formats, including: channel-based signals, static or dynamic object signals, and scene-based signals.

Compared with a traditional video, a unique feature of the VR video is that usually only part of the panoramic videos corresponding to a user current viewing region, that is, a viewport is displayed.

Figure 2:
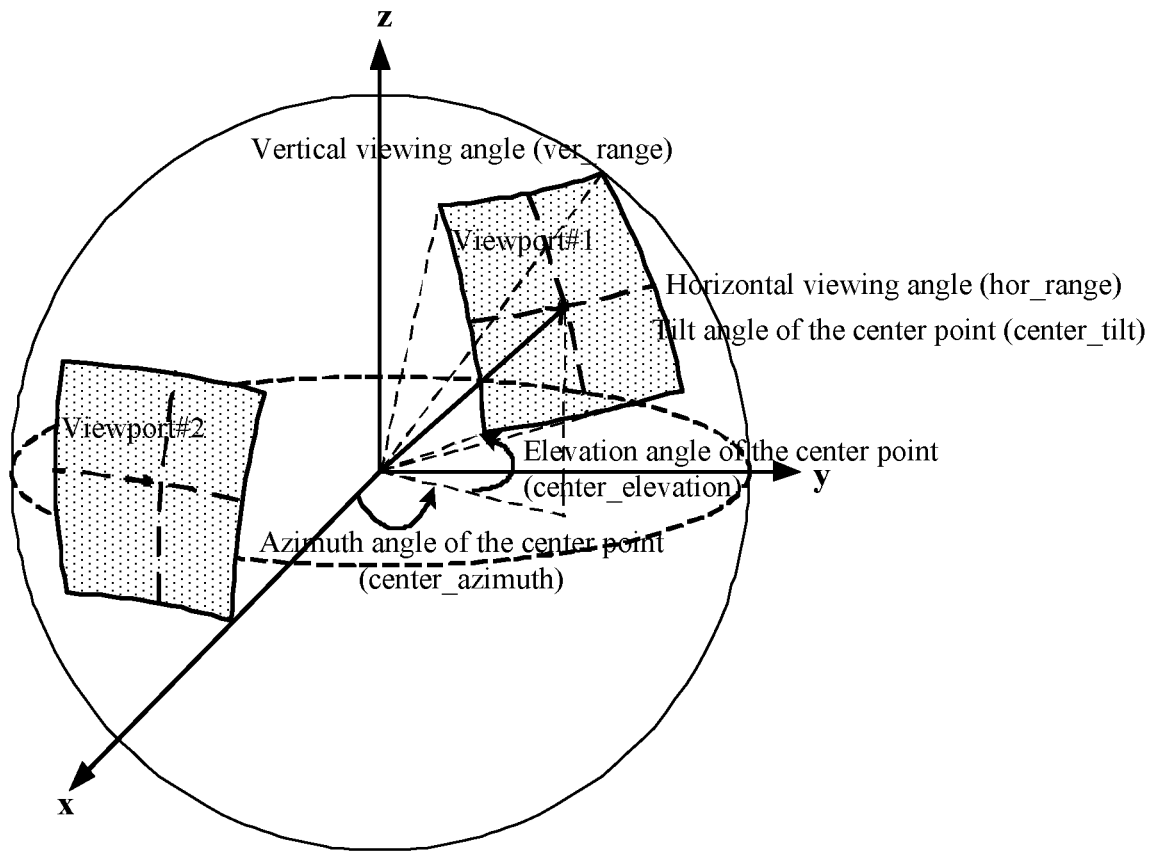
FIG. 2 is a schematic diagram of a projection structure of a VR video image according to an embodiment of the present application.

FIG. 2 is a schematic diagram of a projection structure of a VR video image according to an embodiment of the present application. A VR video image is projected on a unit sphere, an original point of a global coordinate axis is same as a center point of an audio/video acquisition device and a position of an observer's head in a three-dimensional space. When the user watches the VR video, a position of the viewport is represented by a center point of a sphere region where the viewport is located, a horizontal field of view and a vertical field of view of this center point. A position of the center point is represented by an azimuth angle, an elevation angle, and a tilt angle of a rotation required for moving the original point of the coordinate axis described above to this center point. As shown in FIG. 2, the position of the center point of a user viewport, i.e., Viewport #1 at a certain moment is located at (a center azimuth angle of center azimuth, a center elevation angle of center elevation, a center tilt angle of center tilt), and a horizontal viewing angle and a vertical viewing angle of the viewport Viewport #1 are respectively (hor_range, ver_range). At another moment, the user viewport switches from the Viewport #1 to Viewport #2.

VR video image data on the projection structure will be further arranged to form a projection frame of a two-dimensional plane. A VR video projection frame may be segmented into a sub-image sequence or a motion-constrained tile set before being encoded, so that video transmission bandwidth requirements may be reduced or video decoding complexity may be reduced under a condition of providing same video resolution/quality for the user.

Figure 3:
FIG. 3 is a schematic diagram of a VR video projection frame VR based on a motion-constrained tile set according to an embodiment of the present application.

FIG. 3 is a schematic diagram of a VR video projection frame based on a motion-constrained tile set (MCTS) according to an embodiment of the present application. Each motion-constrained tile set sequence serves as a subset of a tile track covering a VR video spatial region, and may be independently decoded and encapsulated into a video file for a streaming transmission. A same VR video content source may be encoded into multiple bitstreams with different resolutions or qualities (bit rates). As shown in FIG. 3, tile videos such as tile1 and tile4 correspond to a user viewport, i.e., Viewport #1, and tile videos such as tile3 and tile6 correspond to the user viewport, i.e., Viewport #2.

The encoder encodes and compresses digital video signals and audio signals output by the content acquisition device, and these digital video signals and audio signals are usually encoded into audio and video elementary streams with multiple code rates to cover different network bandwidth requirements. The encapsulator encapsulates an original audio and video elementary stream into multiple media segment files with fixed time intervals. In addition, the encapsulator is also responsible for providing index information of the media segment files, such as a media presentation description (MPD) in a dynamic adaptive streaming over hypertext transfer protocol (HTTP) (DASH).

The streaming media server 20 is responsible for storing media segment files produced and output by the content production domain 10 and corresponding media presentation description information. The streaming media server 20 may be any suitable type of network server, such as a center node server or an edge node server of a content delivery network (CDN), a proxy server, a web server, or a combination thereof. The terminal 30 may establish a network connection with the streaming media server 20 through any suitable type of access network and request access to the media segment files.

The terminal 30 includes: a streaming media client 301 such as a dynamic adaptive streaming over HTTP (DASH)

client, which provides accessing, decoding, and caching of media resources such as a VR video, etc.; and a video player 302 such as a virtual reality head-mounted display (HDM), which is capable of tracking changes of a user viewing angle and posture, and magnifying an image on a micro-display screen by means of a visual optical system located in front of user eyes, thereby providing a VR video immersive display effect.

The terminal 30 selects a resolution or quality of a VR video file to be transmitted based on a metadata such as a viewpoint orientation, a viewport, and the like. As shown in FIG. 3, the user viewport at a certain moment is Viewport #1, and the resolutions or qualities of video tracks of the tile1 and tile4 corresponding to the viewport Viewport #1 requested by the terminal 30 should be higher than those of video tracks of other invisible regions. But when the user viewport is switched to Viewport #2, the terminal 30 is requested to acquire video tracks of the tile3 and tile6 with higher resolutions or qualities.

Figure 4:
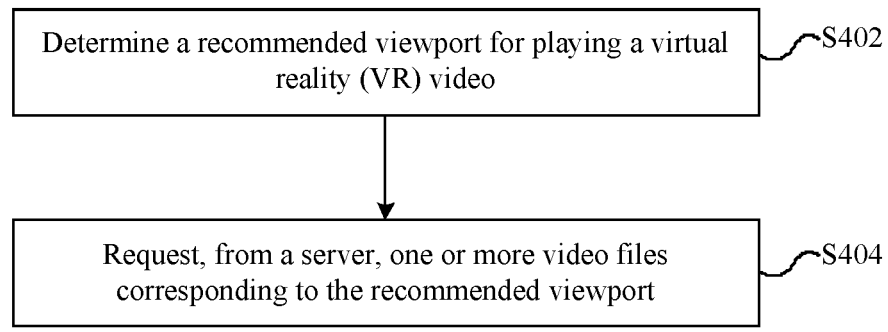
FIG. 4 is a flowchart of a video transmission method according to an embodiment of the present application.

In this embodiment, a video transmission method operating on the above network architecture is provided. FIG. 4 is a flowchart of a video transmission method according to an embodiment of the present application, which may be applied to a terminal or a client, as shown in FIG. 4, this process includes step S402 and step S404.

In step S402, a recommended viewport for playing a virtual reality (VR) video is determined.

In step S404, one or more video files corresponding to the recommended viewport are requested from a server.

Through the above steps, the video file corresponding to the recommended viewport is requested from the server, the video file corresponding to the recommended viewport may be acquired from the server in advance, cached and loaded locally, a system latency defect caused by a VR video viewport switching in the related art is overcome, so that a VR video transmission processing is more efficient, and meanwhile the user service experience is improved.

Figure 5:
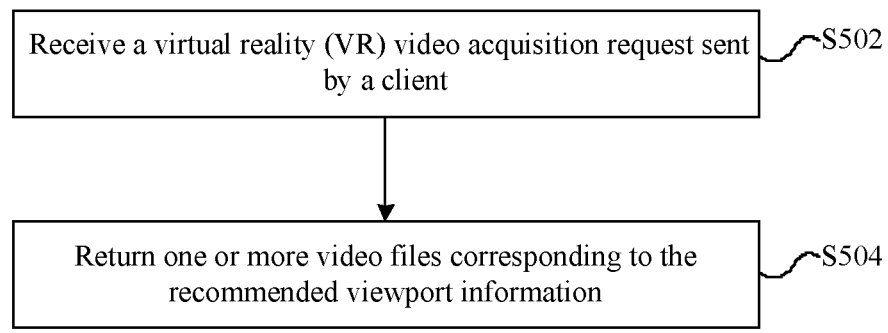
FIG. 5 is a flowchart of another video transmission method according to an embodiment of the present application.

In this embodiment, a video transmission method operating on the above network architecture is provided. FIG. 5 is a flowchart of another video transmission method according to an embodiment of the present application, which may be applied to a server, as shown in FIG. 5, this process includes step S502 and step S504.

In step S502, a virtual reality (VR) video acquisition request sent by a client is received.

Where, the VR video acquisition request carries recommended viewport information.

In step S504, one or more video files corresponding to the recommended viewport information are returned.

In an embodiment, a manner for determining the recommended viewport for playing the VR video includes one of following steps.

First recommended viewport information carried by an event in a media presentation description (MPD) is acquired, and the recommended viewport for playing the VR video is determined according to the first recommended viewport information;

third recommended viewport information carried by a viewport descriptor in the media presentation description (MPD) is acquired, and the recommended viewport for playing the VR videos is determined according to the third recommended viewport information;

second recommended viewport information carried by an in-band event message in a media segment is acquired, and the recommended viewport for playing the VR video is determined according to the second recommended viewport information; or fourth recommended viewport information carried in a server and network assisted dynamic adaptive streaming over HTTP (SAND) message is acquired, and the recommended viewport for playing the VR video is determined according to the fourth recommended viewport information.

In this embodiment, a sphere region of the recommended viewport in the VR video is different from a sphere region of a current video playing viewport.

In an embodiment, the recommended viewport information includes at least one of: information about a sphere region of the recommended viewport, type information of the recommended viewport, description information of the recommended viewport, or playing time information of the recommended viewport.

The scheme of this embodiment further includes information about a sphere region covered by a video content carried by a content coverage descriptor in the MPD is acquired.

In this embodiment, a position of the sphere region is characterized by following information: a center point of the sphere region, an azimuth angle range of the center point, and a pitch angle range of the center point.

In an embodiment, the step in which the one or more video files corresponding to the recommended viewport are requested from the server includes a step described below. One or more video files of a sphere region covered by a video content corresponding to a sphere region of the recommended viewport are requested from the server.

In an embodiment, the step in which the one or more video files corresponding to the recommended viewport are requested from the server further includes a step described below. The one or more video files corresponding to the recommended viewport are requested from the server according to the playing time information of the recommended viewport.

Through the description of the above embodiment, those skilled in the art may clearly understand that the method according to the above embodiment may be implemented by means of software plus a necessary universal hardware platform, and of course, may also be implemented by hardware, but in many cases the former is a better implementation. Based on this understanding, the technical scheme of the present disclosure, either essentially or in terms of contributions to the related art, may be embodied in the form of a software product, which is stored in a storage medium (such as a read-only memory (ROM)/a random access memory (RAM), a magnetic disk, an optical disc), and includes several instructions for causing a terminal device (which may be a mobile phone, a computer, a server, or a network device, etc.) to perform the methods described in the embodiments of the present disclosure.

Embodiment Two

In this embodiment, a video transmission apparatus is also provided, the apparatus includes a client and a server, and the video transmission apparatus is used to implement the foregoing embodiment and application implementations, and the descriptions will not be repeated here. As used below, the term "module" may implement a combination of at least one of software and hardware with a predetermined function. Although the apparatuses described in the following embodiments are preferably implemented in software, implementations in hardware or in a combination of software and hardware are also possible and conceived.

This embodiment provides a client 60, the client 60 includes a determination module 600 and a request module 602.

The determination module 600 is configured to determine a recommended viewport for playing a virtual reality (VR) video. The request module 602 is configured to request one or more video files corresponding to the recommended viewport from a server.

This embodiment provides a server 62, the server 62 includes a receiving module 620 and a sending module 622. The receiving module 620 is configured to receive a virtual reality (VR) video acquisition request sent by the client, where the VR video acquisition request carries recommended viewport information. The sending module 622 is configured to return one or more video files corresponding to the recommended viewport information.

Figure 6:
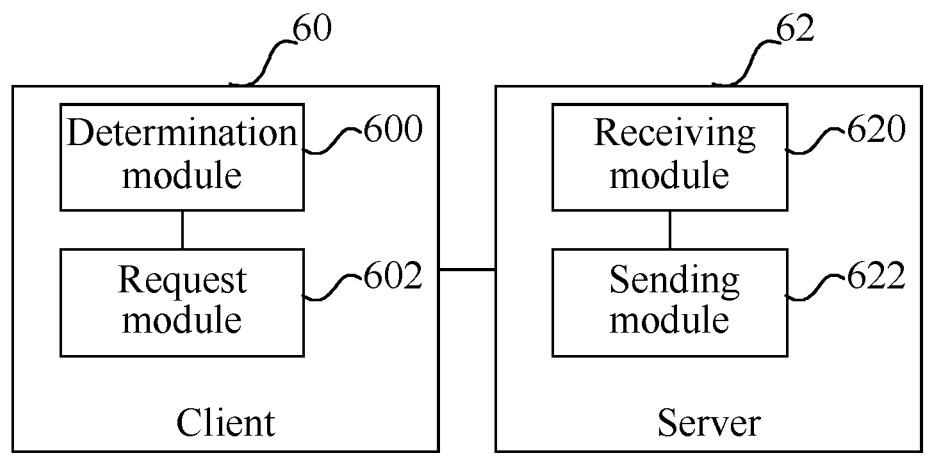
FIG. 6 is a diagram of a video transmission system according to an embodiment of the present application.

FIG. 6 is a diagram of a video transmission system of this embodiment. As shown in FIG. 6, the system of this embodiment includes the client 60 and the server 62 described above.

It should be noted that the above multiple modules may be implemented by software or hardware. For the latter, the above modules may be implemented in manners described below, but are not limited thereto: the above modules are located in a same processor; or the above multiple modules are respectively located in different processors in an arbitrary combination manner.

Embodiment Three

This embodiment includes multiple implementations, which are used to describe the present application in detail through different examples.

Figure 7A:
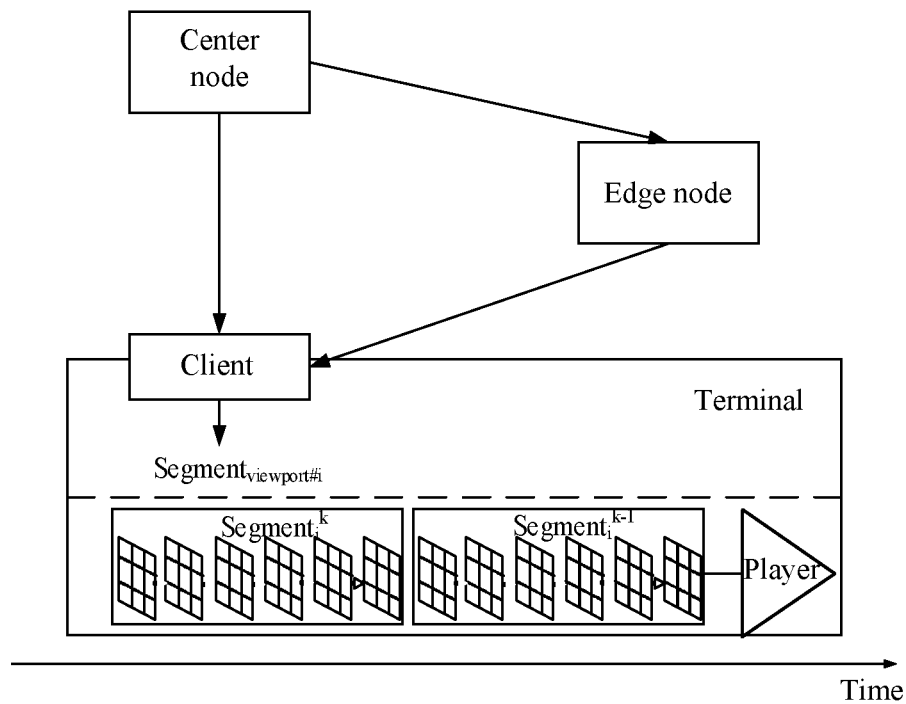
FIGS. 7A, 7B and 7C are schematic diagrams of a VR video viewpoint adaptive transmission and a VR video viewport switching latency in this embodiment.
Figure 7B:
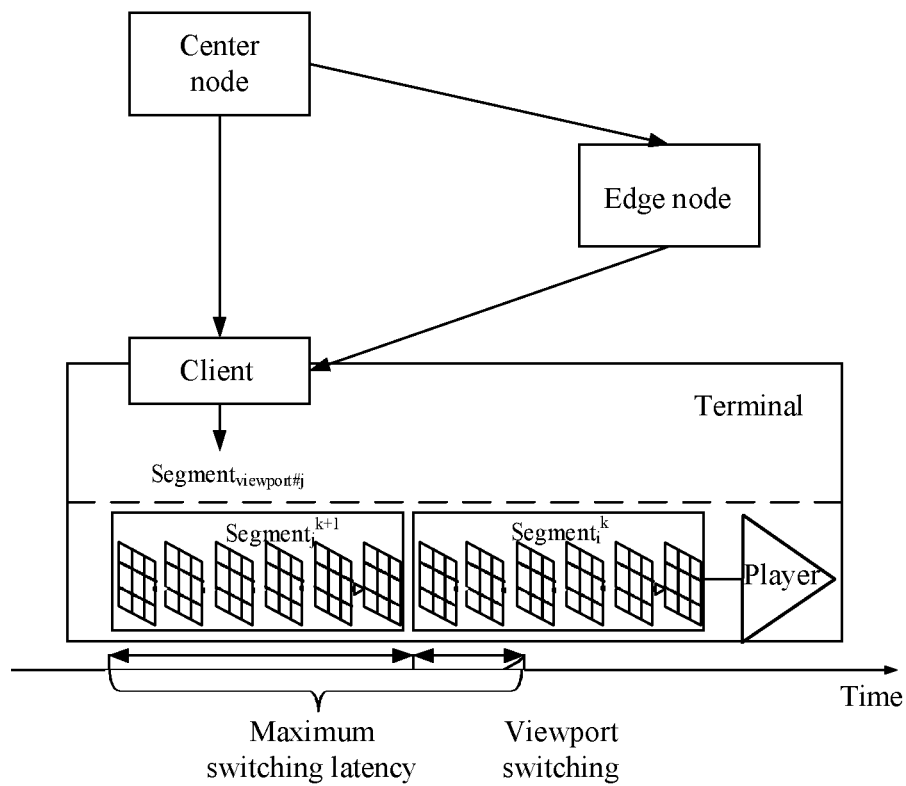
Figure 7C:
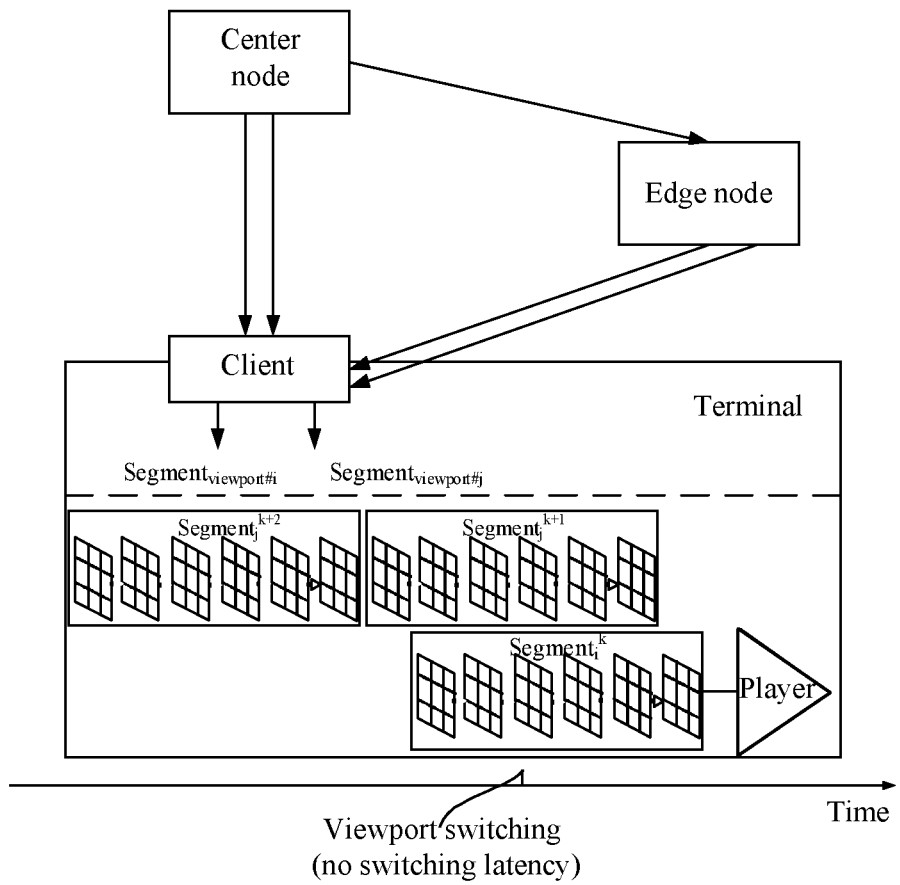

FIG. 7A, FIG. 7B and FIG. 7C are schematic diagrams of a VR video viewpoint adaptive transmission and a VR video viewport switching latency in this embodiment, which may be used to explain all implementations of the embodiments of the present application.

In FIG. 7A, according to a user current video playing viewport Viewport #i, a client requests media segments such as $Segment_i^{k-1}$, $Segment_i^k$ etc. in a video file corresponding to the viewport Viewport #i.

In FIG. 7B, the user is about to switch from the current video playing viewport, i.e., Viewport #i to a viewpoint, i.e., Viewport #j. Although the client has requested a media segment, i.e., $Segment_j^{k+1}$ in a video file corresponding to the viewport Viewport #j, a relatively obvious viewport switching latency exists in a related scheme due to the existence of a client-server request response interaction process and processing steps of video decoding, caching and the like.

FIG. 7C is a schematic diagram of a low-latency VR viewport switching video transmission technology proposed based on this application. In FIG. 7C, the client first determines a recommended viewport Viewport #j for playing the VR video based on recommended viewport information, continues to download $Segment_i^k$ of a video file corresponding to the current video playing viewport Viewport #i, and requests media segments such as $Segment_j^{k+1}$, $Segment_j^{k+2}$ etc. in a video file corresponding to the recommended viewport Viewport #j from the server in advance, so as to achieve a low latency viewport switching VR video transmission.

Figure 8:
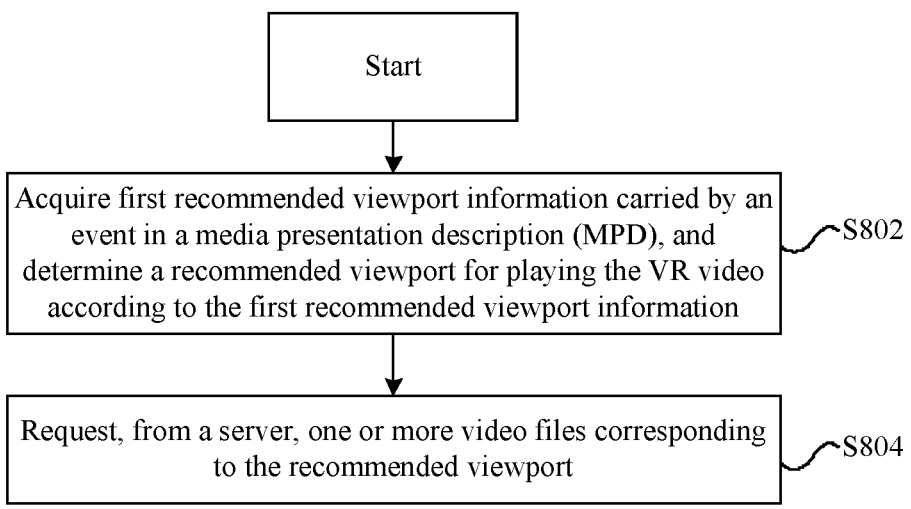
FIG. 8 is a flowchart one of a video transmission method according to an implementation of the present application.

FIG. 8 is a flowchart one of a video transmission method according to an implementation of the present application. As shown in FIG. 8, this process includes step S802 and step S804.

In step S802, first recommended viewport information carried by an event in a media presentation description (MPD) is acquired, and a recommended viewport for playing a VR video is determined according to the first recommended viewport information.

In step S804, one or more video files corresponding to the recommended viewport are requested from a server.

The step S802 records the recommended viewport information carried by the event in the MPD. The recommended viewport information of the event in the MPD will be described below in conjunction with an application implementation.

FIG. 9 is an example of an event message in the MPD according to an application implementation of the present application. As shown in FIG. 9, a schemeIdUri attribute having a value of "urn:ays:vrevent:2018" and a value attribute having a value of "1" in an event stream <EventSteam> element in the media presentation description (MPD) are used to collectively identify this event as a recommended viewport event. Where, the <EventStream> element contains one or more event <Event> elements, and a "presentationTime" attribute and a "messageData" attribute in each <Event> element respectively represent recommended viewport information in the recommended viewport event. As an example of this embodiment, the presentationTime attribute having a value of "10000" and the messageData attribute having a value of "60,30,0,90,60" respectively represent playing time information of the recommended viewport and information about a sphere region of the recommended viewport which is used to represent a sphere region where the recommended viewport is located at that time. Without loss of generality, the recommended viewport event in the media presentation description (MPD) may further include other recommended viewport information, such as type information of the recommended viewport, description information of the recommended viewport and the like.

Figure 10:
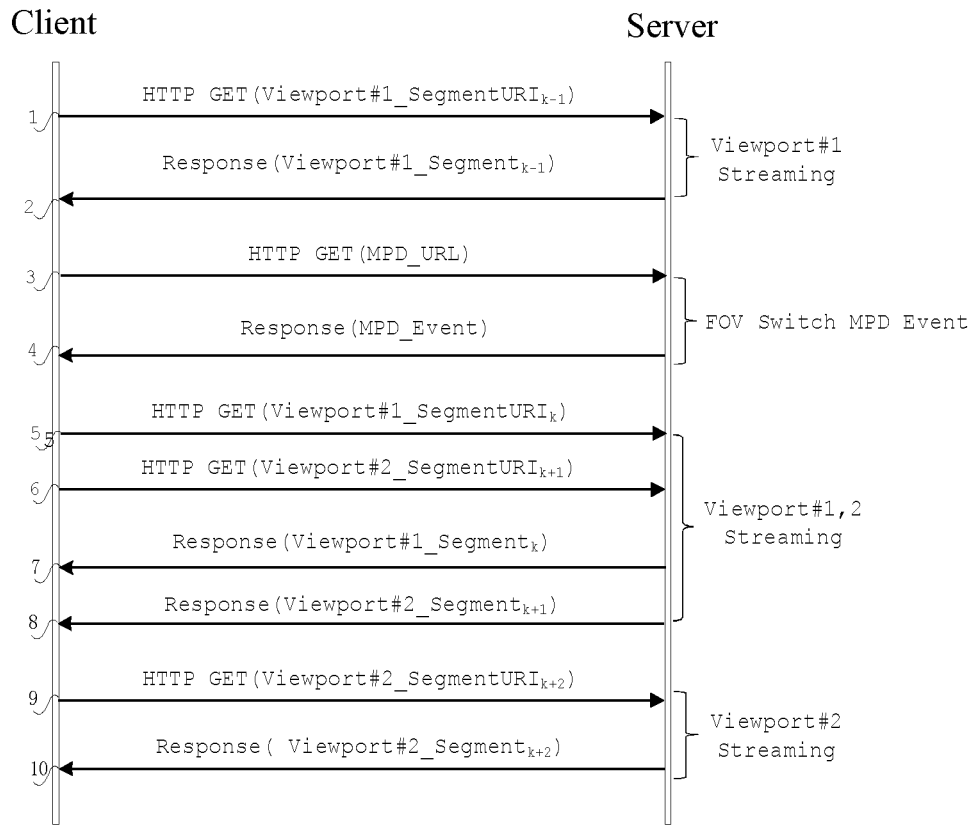
FIG. 10 is a flowchart one of a low-latency viewport switching video transmission method according to an alternative implementation of the present application.

The step S804 records that the one or more video files corresponding to the recommended viewport information are requested from the server. The step in which the one or more video files corresponding to the recommended viewport information are requested from the server will be described below in conjunction with an application implementation. FIG. 10 is a flowchart one of a low-latency viewport switching video transmission method according to an application implementation of the present application. As shown in FIG. 10, this process includes steps 1 to 10.

In steps 1 to 2, a user viewport played by a VR video at a certain moment is Viewport #1, and a client requests to acquire a media segment, i.e., $Viewport\ \#1\_Segment_{k-1}$ in a video file corresponding to the viewport Viewport #1.

In steps 3 to 4, the client requests a server to acquire an updated media presentation description (MPD) file, the MPD file contains a recommended viewport event in the MPD defined by this application and recommended viewport information carried by the recommended viewport event in the MPD. The recommended viewport information carried by the event in the MPD acquired by the client includes at least one of: the information about a sphere region of the recommended viewport, the type information of the recommended viewport, the description information of the recommended viewport, or the playing time information of the recommended viewport.

At the same time, the client also acquires information about a sphere region covered by a video content carried by a content coverage descriptor in the MPD, such as information about a sphere region corresponding to the tile video based on the MCTS encoding shown in FIG. 3.

In steps 5 to 8, the client continues to request to acquire a media segment, i.e., $Viewport\ \#1\_Segment_k$ in the video file corresponding to the viewport Viewport #1. In this embodiment, it is assumed that the recommended viewport event in the MPD contains recommended viewport information corresponding to a viewport Viewport #2, and the client will determine the recommended viewport Viewport

2 for playing the VR video according to the recommended viewport information. If a sphere region of the recommended viewport Viewport #2 in the VR video is different from a sphere region of a current video playing viewport Viewport #1, the client requests a media segment, i.e., Viewport #2_Segment$_{k+1}$ in one or more video files of a sphere region covered by the video content corresponding to the sphere region of the recommended viewport Viewport #2 from the server according to playing time information of the recommended viewport Viewport #2.

In steps 9 to 10, the VR video playing viewport is switched to Viewport #2, and the client requests to acquire a media segment, i.e., Viewport #2_Segment$_{k+2}$ in the video file corresponding to the viewport Viewport #2.

Figure 11:
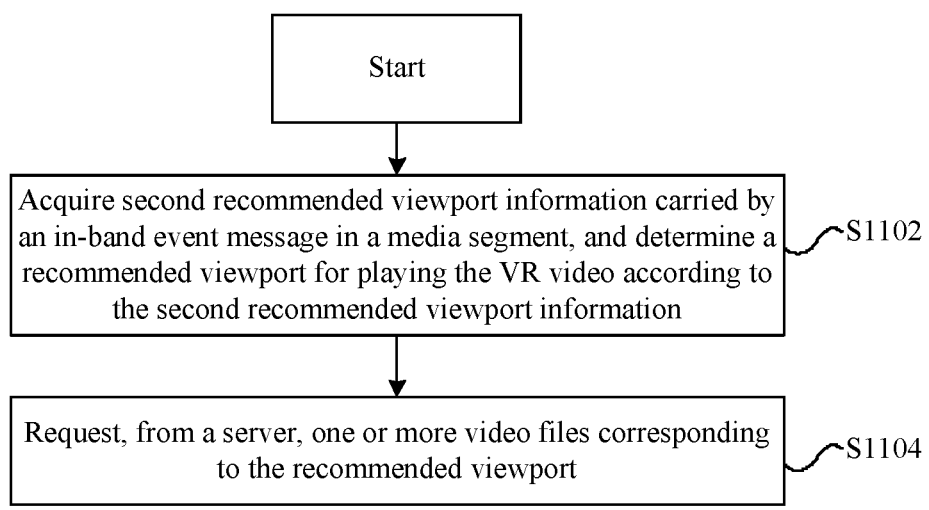
FIG. 11 is a flowchart two of a video transmission method according to an implementation of the present application.

FIG. 11 is a flowchart two of another video transmission method according to an implementation of the present application. As shown in FIG. 11, this process includes step S1102 and step S1104.

In step S1102, second recommended viewport information carried by an in-band event message in a media segment is acquired, and a recommended viewport for playing a VR video is determined according to the second recommended viewport information.

In step S1104, one or more video files corresponding to the recommended viewport are requested from a server.

The step S1102 records that the recommended viewport information is carried in the in-band event message box. The recommended viewport information in the in-band event message box will be described below in conjunction with an alternative implementation.

A recommended viewport event message is acquired in the step S1102 of FIG. 11. In an embodiment, the recommended viewport event message may be implemented by using a recommended viewport event message box. The application implementation using the recommended viewport event message box will be described below.

A recommended viewport event is set to inform a client of information for video playing the recommended viewport.

When the "scheme_id_uri" field in the event message box is set to be "urn:ays:vr:event:2018" and the "value" field in the event message box is set to be "1", then the event message box is the recommended viewport event message box, and message fields carried by the recommended viewport event message box follow regulations described below.

A "presentation_time_delta" field provides the playing time information of the recommended viewport in the recommended viewport event, that is, an increment of media presentation time of the recommended viewport relative to the earliest presentation segment time.

A "message_data[ ]" field provides the information about the sphere region of the recommended viewport in the recommended viewport event.

A segment with the "presentation_time_delta" field in the event message box having a value of "0" is an initial playing segment of the recommended viewport in the recommended viewport event.

For same recommended viewports in the recommended viewport event, instances of recommended viewport event message boxes must have a same "id" field value and satisfy a following formula:

$$RVMPT^{id}=ept_i^{id}+emsg_i^{id}.\text{presentation\_time\_delta}/emsg_i^{id}.\text{timescale}$$

Where, $RVMPT^{id}$ represents media presentation time of the initial playing segment in the recommended viewport event;

$ept_i^{id}$ represents an earliest presentation time of segment i in the recommended viewport event; and $emsg_i^{id}.\text{presentation\_time\_delta}$ and $emsg_i^{id}.\text{timescale}$ respectively represent a media presentation time increment value and a time scale value in instance i of the recommended viewport event message box.

Figure 12:
FIG. 12 is a diagram of an example for determining an initial playing media segment of a recommended viewport according to an implementation of the present application.

FIG. 12 is a diagram of an example for determining an initial playing media segment of a recommended viewport according to an implementation of the present application. As shown in FIG. 12, it includes contents described below.

Multiple representation elements of an MPD document contain an InbandEventStream element corresponding to this event scheme. When a recommended viewport event needs to be notified, information such as an increment of the initial playing segment of the recommended viewport relative to the earliest presentation segment time (presentation_time_delta) and a sphere region (message_data[ ]) of the recommended viewport will be added to a corresponding recommended viewport event message box. The recommended viewport event message may appear in multiple segments.

The terminal retrieves and determines AdaptationSet of a period element in the MPD and the InbandEventStream element in a representation level, that is, the InbandEventStream element included in the period element and having an attribute value of @id of "1" in FIG. 12 according to an identification field value of an event stream scheme, such as "urn:ays:vr:event:2018", and the field value of an event stream value, such as "1".

The terminal uses a media segment template sub-element or a media segment uniform resource locator (URL) sub-element of this period element, and combines a resource URL address base (Base URL) element defined in other levels of the MPD, such as "http://www.example.com/", so as to construct HTTP URLs of media segments corresponding to the in-band event stream, that is, the different directional URLs in FIG. 12.

The terminal requests to acquire a media segment content according to the above HTTP URLs, and extracts the event message box carried therein, that is, information of "the recommended viewport" event defined by the present application. The terminal retrieves the "id" field of the "the recommended viewport" event message box according to the event identification field value, such as "123", and determines a media segment corresponding to the event message box with the "presentation_time_delta" field having a value of "0" in the retrieval result as the initial playing segment of the recommended viewport, i.e. fourth media segment from the left in FIG. 12.

The step S1104 records that the one or more video files corresponding to this recommended viewport are requested from the server. The step in which the one or more video files corresponding to this recommended viewport are requested from the server will be described below in conjunction with an application implementation.

Figure 13:
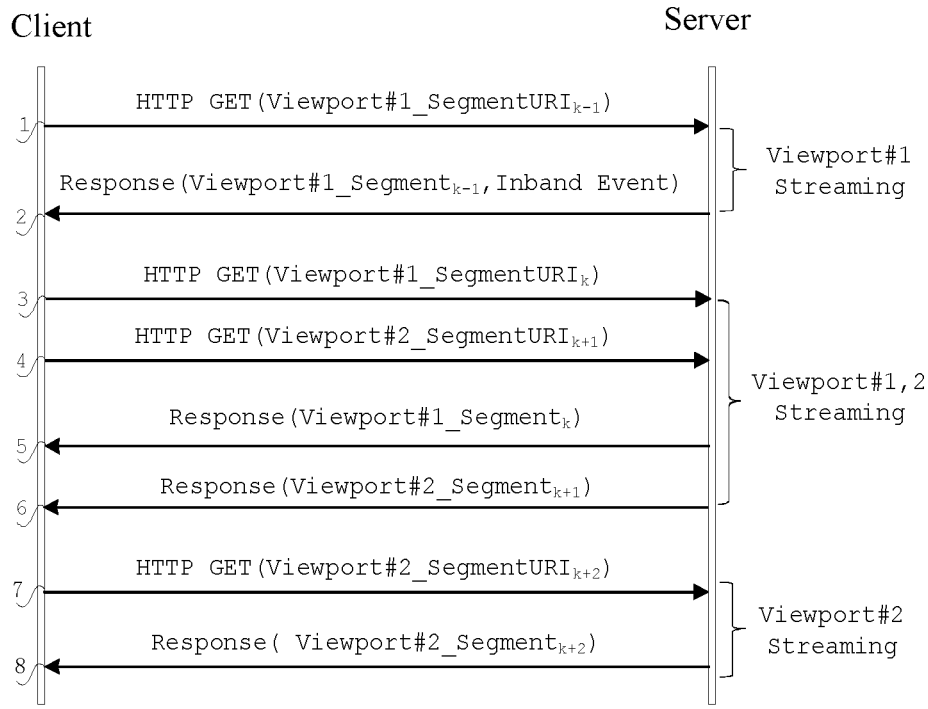
FIG. 13 is a flowchart two of a low-latency viewport switching video transmission method according to an alternative implementation of the present application.

FIG. 13 is flowchart two of a low-latency viewport switching video transmission method according to an application implementation of the present application. As shown in FIG. 13, this process includes steps 1 to 8.

In steps 1 to 2, a user viewport played by the VR video at a certain moment is Viewport #1, and the client requests to acquire a media segment, i.e., Viewport #1_Segment$_{k-1}$ in the video file corresponding to the viewport, i.e., Viewport #1, the segment Viewport #1_Segment$_{k-1}$ contains the in-band event of the recommended viewport defined by this application and recommended viewport information carried by the in-band event of the recommended viewport.

The recommended viewport information in the in-band event of the recommended viewport acquired by the client includes at least one of: the information about the sphere region of the recommended viewport, the type information of the recommended viewport, the description information of the recommended viewport, or the playing time information of the recommended viewport.

At the same time, the client also acquires the information about the sphere region covered by a video content carried by a content coverage descriptor in the MPD, such as information about the sphere region corresponding to the tile video based on the MCTS encoding shown in FIG. 3.

In steps 3 to 6, the client continues to request to acquire a media segment, i.e., Viewport #1_Segment$_k$ in the video file corresponding to the viewport Viewport #1. In this embodiment, it is assumed that the in-band event of the recommended viewport includes the recommended viewport information corresponding to Viewport #2, and the client will determine the recommended viewport Viewport #2 for playing the VR video according to the recommended viewport information. If the sphere region of the recommended viewport Viewport #2 in the VR video is different from the sphere region of the current video playing viewport Viewport #1, the client requests a media segment, i.e., Viewport #2_Segment$_{k+1}$ in one or more video files of the sphere region covered by the video content corresponding to the sphere region of the recommended viewport Viewport #2 according to the playing time information of the recommended viewport Viewport #2 from the server.

In steps 7 to 8, the VR video playing viewport is switched to Viewport #2, and the client requests to acquire a media segment, i.e., Viewport #2_Segment$_{k+2}$ in the video file corresponding to the viewport Viewport #2.

FIG. 14 is a flowchart three of a video transmission method according to an implementation of the present application. As shown in FIG. 14, this process includes step S1402 and step S1404.

In step S1402, third recommended viewport information carried by a viewport descriptor in the media presentation description (MPD) is acquired, and the recommended viewport for playing the VR video is determined according to the third recommended viewport information.

In step S1404, one or more video files corresponding to the recommended viewport are requested from a server.

The step S1402 records the viewport descriptor carrying the recommended viewport information, and the recommended viewport information in the viewport descriptor is described below in conjunction with an alternative implementation.

FIG. 15 is an example of an MPD viewport descriptor according to an application implementation of the present application. As shown in FIG. 15, a schemeIdUri attribute having a value of "urn:ays:vr:rcvp:event:2018" of a viewport <Viewport > element in a media presentation description (MPD) identifies that this auxiliary descriptor is a viewport descriptor. A schemeIdUri attribute having a value of "urn:ays:vr:cc:event:2018" in a sphere spatial relation <SSR> element in the media presentation description (MPD) identifies the auxiliary descriptor as a content coverage descriptor. The viewport <Viewport > element and the sphere spatial relation <SSR> element at a same level with the viewport element jointly represent the recommended viewport information of the viewport descriptor.

As an example of this embodiment, a value attribute in the viewport element <Viewport > having a value of "10000" and a value attribute in the <SSR> element having a value of "60,30,0,90,60" respectively represent the playing time information of the recommended viewport and the information about the sphere region of the recommended viewport which is used to represent the sphere region where the recommended viewport is located at that time. Without loss of generality, the recommended viewport event in the media presentation description (MPD) may also include other recommended viewport information, including the type information of the recommended viewport, the description information of the recommended viewport and the like.

The step S1404 records the one or more video files corresponding to the recommended viewport which are requested from the server. The step in which the one or more video files corresponding to this recommended viewport are requested from the server will be described below in conjunction with an alternative implementation.

Figure 16:
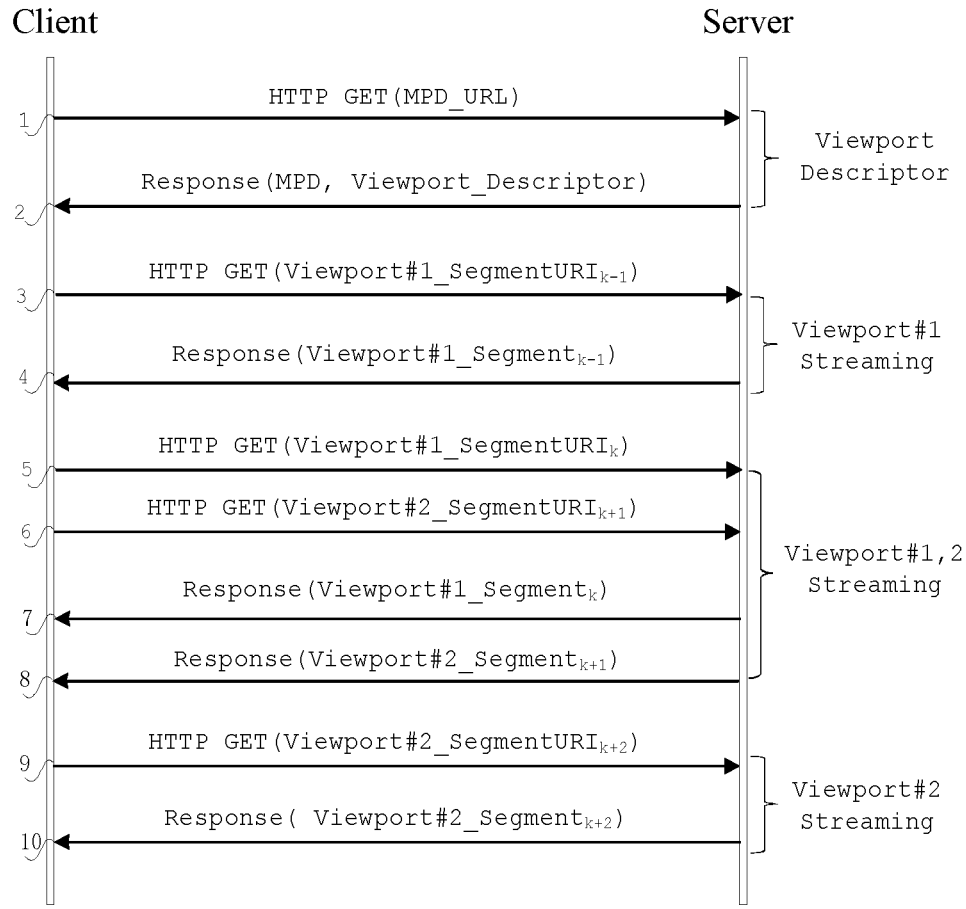
FIG. 16 is a flowchart three of a low-latency viewport switching video transmission method according to an alternative implementation of the present application.

FIG. 16 is flowchart three of a low-latency viewport switching video transmission method according to an application implementation of the present application. As shown in FIG. 16, this process includes following steps 1 to 10.

In steps 1 to 2, the client requests the server to acquire an updated media presentation description (MPD) file, the MPD file contains the viewport descriptor defined by this application and recommended viewport information carried by this viewport descriptor. The recommended viewport information carried by the viewport descriptor acquired by the client includes at least one of: the information about the sphere region of the recommended viewport, the type information of the recommended viewport, the description information of the recommended viewport, or the playing time information of the recommended viewport.

Meanwhile, the client also acquires the information about the sphere region covered by the video content carried by the content coverage descriptor in the MPD, such as the information about the sphere region corresponding to the tile video based on the MCTS encoding shown in FIG. 3.

In steps 3 to 4, the client first requests to acquire a media segment, i.e., Viewport #1_Segment$_{k-1}$ in the video file corresponding to the viewport Viewport #1.

In steps 5 to 8, the client continues to request to acquire a media segment, i.e., Viewport #1_Segment$_k$ in the video file corresponding to the viewport Viewport #1. In this embodiment, it is assumed that the viewport descriptor contains recommended viewport information corresponding to Viewport #2, and the client will determine the recommended viewport, i.e., Viewport #2 for playing the VR video according to the recommended viewport information. If the sphere region of the recommended viewport Viewport #2 in the VR video is different from the sphere region of the current video playing viewport Viewport #1, the client requests a media segment, i.e., Viewport #2_Segment$_{k+1}$ in one or more video files of the sphere region covered by the video content corresponding to the sphere region of the recommended viewport Viewport #2 according to playing time information of the recommended viewport Viewport #2 from the server.

In steps 9 to 10, the VR video playing viewport is switched to Viewport #2, and the client requests to acquire a media segment, i.e., Viewport #2_Segment$_{k+2}$ in the video file corresponding to the viewport Viewport #2.

Figure 17:
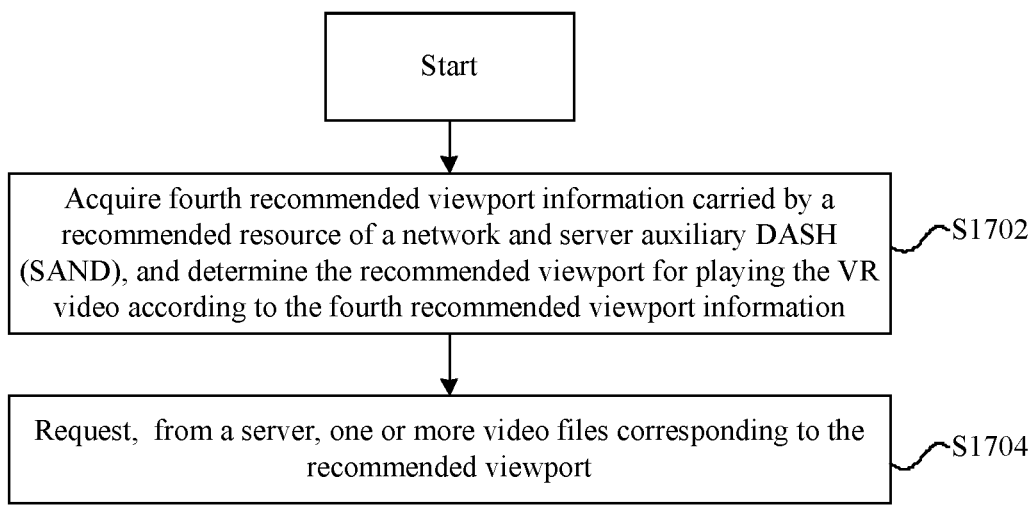
FIG. 17 is a flowchart four of a video transmission method according to an implementation of the present application.

FIG. 17 is a flowchart four of a video transmission method according to an implementation of the present application. As shown in FIG. 17, this process includes step S1702 and step S1704.

In step S1702, fourth recommended viewport information carried by a recommended resource of a server and network DASH (SAND) is acquired, and the recommended viewport for playing the VR video is determined according to the fourth recommended viewport information.

In step S1704, one or more video files corresponding to the recommended viewport are requested from a server.

The step S1702 records the recommended viewport information carried by the SAND recommended resource, and the recommended viewport information in the SAND recommended resource will be described below in conjunction with alternative implementations.

An SAND recommended resource message allows a DASH aware network entity (DANE) to notify a DASH client of downloading a recommended viewport resource in advance, and the recommended viewport resource may be specified through a spatial position of a sphere region or a representation identification (ID) of a video file.

The recommended viewport resource is defined as follows:

type: receiving an auxiliary message;
sender: a DASH network entity;
receiver: a DASH client.

Table 1 is used for describing parameters of the recommended viewport resource (spatial position).

TABLE 1

| Parameter | Type | Cardinal number | Description |
| --- | --- | --- | --- |
| Recommended resource state | object | 1 | Resource information recommended for the DASH client to download in advance |
| Resource spatial position | array | 1 . . . N | Recommended resource information list |
| view_idc | int | 0 . . . 1 | 0 represents that a sphere region covered by the recommended resource is a single view, 1 represents that the sphere region covered by the recommended resource is a left view with a stereoscopic content, 2 represents that the sphere region covered by the recommended resource is a right view with the stereoscopic content, and 3 represents that the sphere region covered by the recommended resource is on both the left view and the right view. |
| shape_type | int | 0 . . . 1 | Specify a shape type of the sphere region covered by the recommended resource |
| center_azimuth | float | 0 . . . 1 | Specify the azimuth angle of a center point of the sphere region covered by the recommended resource relative to the global coordinate axis. A default value is "0". |
| center_elevation | float | 0 . . . 1 | Specify the elevation angle of the center point of the sphere region covered by the recommended resource relative to the global coordinate axis. A default value is "0". |
| center_tilt | float | 0 . . . 1 | Specify the tilt angle of the center point of the sphere region covered by the recommended resource relative to the global coordinate axis. A default value is "0". |
| hor_range | float | 1 | Specify a horizontal extent of the sphere region covered by the recommended resource across the center point. A default value is equal to $360*2^{16}$. |
| ver_range | float | 1 | Specify a vertical extent of the sphere region covered by the recommended resource across the center point. A default value is equal to $180*2^{16}$. |

Table 2 is used for describing parameters of the recommended viewport resource (representation identification).

TABLE 2

| Parameter | Type | Cardinal number | Description |
| --- | --- | --- | --- |
| Recommended resource | object | 1 | Resource information recommended for the DASH client to download in advance |
| Resource representation information | array | 1 . . . N | Recommended resource information list |
| repId | string | 1 | Specify the presentation identification corresponding to the recommended resource |

The step S1704 records that the one or more video files corresponding to the recommended viewport are requested from the server. The step in which the one or more video files corresponding to this recommended viewport are requested from the server will be described below in conjunction with an application implementation.

Figure 18:
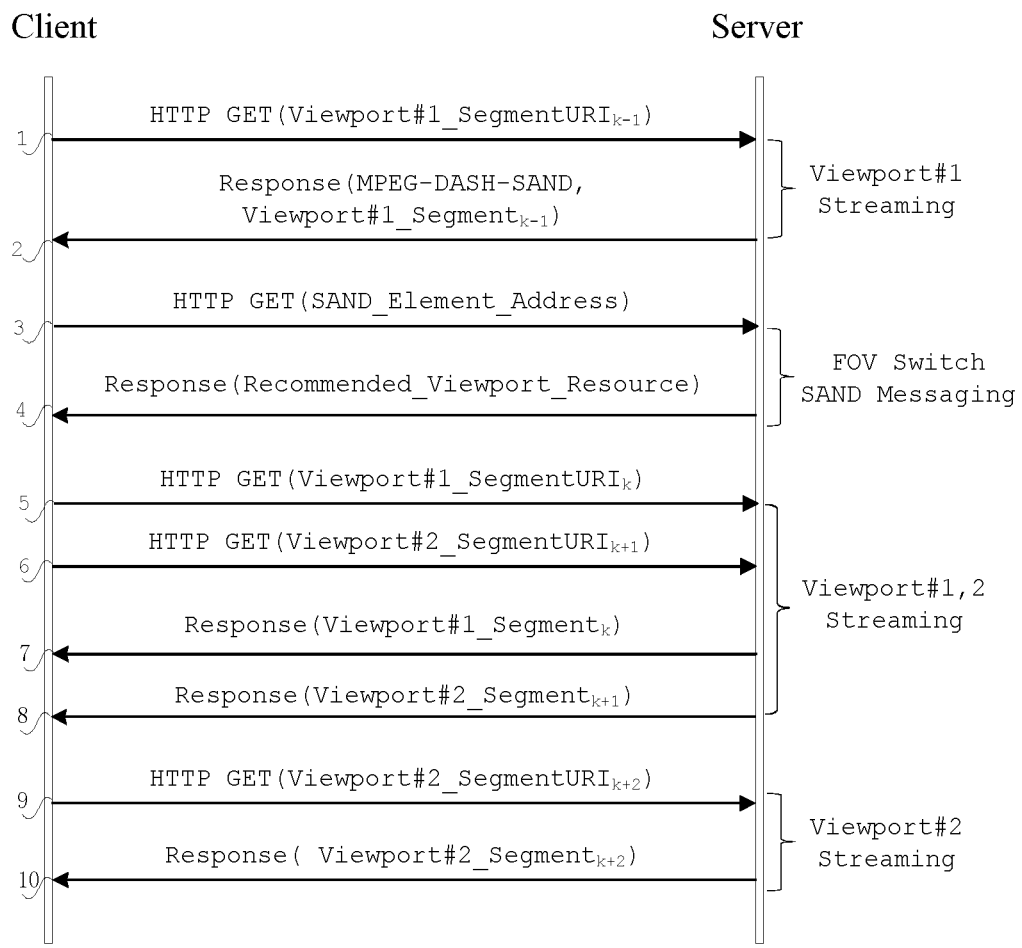
FIG. 18 is a flowchart of a VR video viewport switching latency-free transmission method according to an alternative implementation of the present application.

FIG. 18 is a flowchart of a latency-free VR video viewport switching transmission method according to an application implementation of the present application. As shown in FIG. 18, this process includes steps 1 to 10.

In steps 1 to 2, a user viewport played by the VR video at a certain moment is Viewport #1, and the client requests to acquire a media segment, i.e., Viewport #1_Segment$_{k-1}$ in the video file corresponding to the viewport Viewport #1. The server also returns an access address of an SAND recommended viewport resource.

In steps 3 to 4, the client requests the above access address to acquire the SAND recommended viewport resource. The SAND recommended viewport resource includes the recommended viewport information defined in table 1 or table 2 above. The recommended viewport information of the SAND recommended viewport resource acquired by the client includes at least one of: the information about the sphere region of the recommended viewport, the type information of the recommended viewport, the description information of the recommended viewport, or the playing time information of the recommended viewport.

Meanwhile, the client also acquires the information about the sphere region covered by the video content carried by the content coverage descriptor in the MPD, such as the information about the sphere region corresponding to the tile video based on the MCTS encoding shown in FIG. 3.

In steps 5 to 8, the client continues to request to acquire a media segment, i.e., Viewport #1_Segment$_k$ in the video file corresponding to the viewport Viewport #1. In this embodiment, it is assumed that the recommended viewport event in the MPD contains the recommended viewport information corresponding to Viewport #2, and the client will determine the recommended viewport Viewport #2 for playing the VR video according to the recommended viewport information. If the sphere region of the recommended viewport Viewport #2 in the VR video is different from the sphere region of the current video playing viewport Viewport #1, the client requests a media segment, i.e., Viewport #2_Segment$_{k+1}$ in one or more video files of the sphere region covered by the video content corresponding to the sphere region of the recommended viewport Viewport #2 from the server, according to the playing time information of the recommended viewport Viewport #2.

In steps 9 to 10, the VR video playing viewport is switched to Viewport #2, and the client requests to acquire a media segment, i.e., Viewport #2_Segment$_{k+2}$ in the video file corresponding to the viewport Viewport #2.

Through the above steps, the terminal uses the recommended viewport position information to request one or more video files corresponding to the recommended viewport from the server in advance, so that a system latency defect caused by a VR video viewport switching in the related art is overcome, thus a VR video transmission processing is more efficient, and meanwhile the user service experience is also improved.

Embodiment Four

An embodiment of the present application further provides a storage medium, the storage medium includes a stored program, the above program is executed to perform any one of the above described methods.

In an embodiment, the above storage medium may be configured to store a program code for performing following steps S1 and S2.

In step S1, a recommended viewport for playing a virtual reality (VR) video is determined.

In step S2, one or more video files corresponding to the recommended viewport are requested from a server.

In an embodiment, the above-described storage medium may include, but is not limited to, various media capable of storing the program code, such as a universal serial bus (USB) flash disk, a read-only memory (ROM), a random access memory (RAM), a mobile hard disk, a magnetic disk or optical disk.

An embodiment of the present application further provides a processor, the processor is configured to execute a program, when the program is executed by the processor, the program performs the steps in any one of the above methods.

In an embodiment, the above procedure is configured to perform following steps S1 and S2.

In step S1, a recommended viewport for playing a virtual reality (VR) video is determined.

In step S2, one or more video files corresponding to the recommended viewport are requested from a server.

Examples in this embodiment may be referred to the examples described in the above-described embodiments and application implementations, and details are not described in this embodiment.

Apparently, it should be understood by those skilled in the art that each of the above-mentioned modules or steps of the present application may be implemented by a general-purpose computing apparatus, the modules or steps may be concentrated on a single computing apparatus or distributed over a network composed of multiple computing apparatuses, optically, the modules or steps may be implemented by a program code executable by the computing apparatus, so that the modules or steps may be stored in a storage apparatus and executed by the computing apparatus, and in some cases, the modules or steps may be implemented through the steps shown or described performed in an order different from that herein, or through separately fabricating them as individual integrated circuit modules, or through fabricating multiple modules or steps thereof as a single integrated circuit module. In this way, the present application is not limited to any combination of hardware and software.

What is claimed is:

1. A virtual reality (VR) video transmission method, comprising:
   determining a recommended viewport for playing the VR video; and
   requesting, from a server, at least one video file corresponding to the recommended viewport;
   wherein determining the recommended viewport for playing the VR video comprises: acquiring recommended viewport information carried by a viewport descriptor in the media presentation description (MPD), and determining the recommended viewport for playing the VR video according to the recommended viewport information; wherein the recommended viewport information comprises at least one of: information about a sphere region of the recommended viewport, type information of the recommended viewport, description information of the recommended viewport, or playing time information of the recommended viewport;
   wherein a sphere region of the recommended viewport in the VR video is different from a sphere region of a current video playing viewport.

2. The method of claim 1, further comprising: acquiring information about a sphere region covered by a video content carried by a content coverage descriptor in an MPD.

3. The method of claim 2, wherein a position of the sphere region is characterized by following information: a center point of the sphere region, an azimuth angle range of the center point, and an elevation angle range of the center point.

4. The method of claim 1, wherein a position of the sphere region is characterized by following information: a center point of the sphere region, an azimuth angle range of the center point, and an elevation angle range of the center point.

5. The method of claim 1, wherein requesting, from the server, the at least one video file corresponding to the recommended viewport comprises:
   requesting, from the server, at least one video file of a sphere region covered by a video content corresponding to a sphere region of the recommended viewport.

6. The method of claim 1, wherein requesting, from the server, the at least one video file corresponding to the recommended viewport further comprises: requesting, from the server, the at least one video file corresponding to the recommended viewport according to the playing time information of the recommended viewport.

7. A virtual reality (VR) video transmission method, comprising:
   receiving the VR video acquisition request sent by a client, wherein the VR video acquisition request carries recommended viewport information; and
   returning at least one video file corresponding to the recommended viewport information;

wherein the recommended viewport for playing the VR video is carried by a viewport descriptor in the media presentation description (MPD), and used for determining the recommended viewport for playing the VR video; and the recommended viewport information comprises at least one of: information about a sphere region of the recommended viewport, type information of the recommended viewport, description information of the recommended viewport, or playing time information of the recommended viewport; wherein a sphere region of the recommended viewport in the VR video is different from a sphere region of a current video playing viewport.

8. A client device, comprising: a processor and a memory;

wherein the processor is configured to execute a program stored in the memory to implement the following:

determining a recommended viewport for playing a virtual reality (VR) video; and requesting at least one video file corresponding to the recommended viewport from a server;

wherein determining the recommended viewport for playing the VR video comprises:

acquiring recommended viewport information carried by a viewport descriptor in the media presentation description (MPD), and determining the recommended viewport for playing the VR video according to the recommended viewport information;

wherein the recommended viewport information comprises at least one of: information about a sphere region of the recommended viewport, type information of the recommended viewport, description information of the recommended viewport, or playing time information of the recommended viewport; wherein a sphere region of the recommended viewport in the VR video is different from a sphere region of a current video playing viewport.

9. A server, comprising: a processor and a memory;

wherein the processor is configured to execute a program stored in the memory to implement the following:

receiving a virtual reality (VR) video acquisition request sent by a client, wherein the VR video acquisition request carries recommended viewport information; and returning at least one video file corresponding to the recommended viewport information;

wherein the recommended viewport for playing the VR video is carried by a viewport descriptor in the media presentation description (MPD), and used for determining the recommended viewport for playing the VR video; and the recommended viewport information comprises at least one of: information about a sphere region of the recommended viewport, type information of the recommended viewport, description information of the recommended viewport, or playing time information of the recommended viewport; wherein a sphere region of the recommended viewport in the VR video is different from a sphere region of a current video playing viewport.

10. A non-transitory-storage medium, comprising a stored program, wherein the program is executed to perform the method of claim 1.

11. A non-transitory storage medium, comprising a stored program, wherein the program is executed to perform the method of claim 2.

12. A non-transitory storage medium, comprising a stored program, wherein the program is executed to perform the method of claim 4.

13. A non-transitory storage medium, comprising a stored program, wherein the program is executed to perform the method of claim 5.

14. A non-transitory storage medium, comprising a stored program, wherein the program is executed to perform the method of claim 6.

15. A processor, configured to execute a program, wherein the program, when executed by the processor, performs the method of claim 1.

16. A non-transitory storage medium, comprising a stored program, wherein the program is executed to perform the method of claim 7.

17. A processor, configured to execute a program, wherein the program, when executed by the processor, performs the method of claim 7.

* * * * *